J. P. STOFFEL.
CONVEYER AND CLEANER.
APPLICATION FILED JAN. 21, 1916.
1,220,703.
Patented Mar. 27, 1917.
2 SHEETS—SHEET 1.
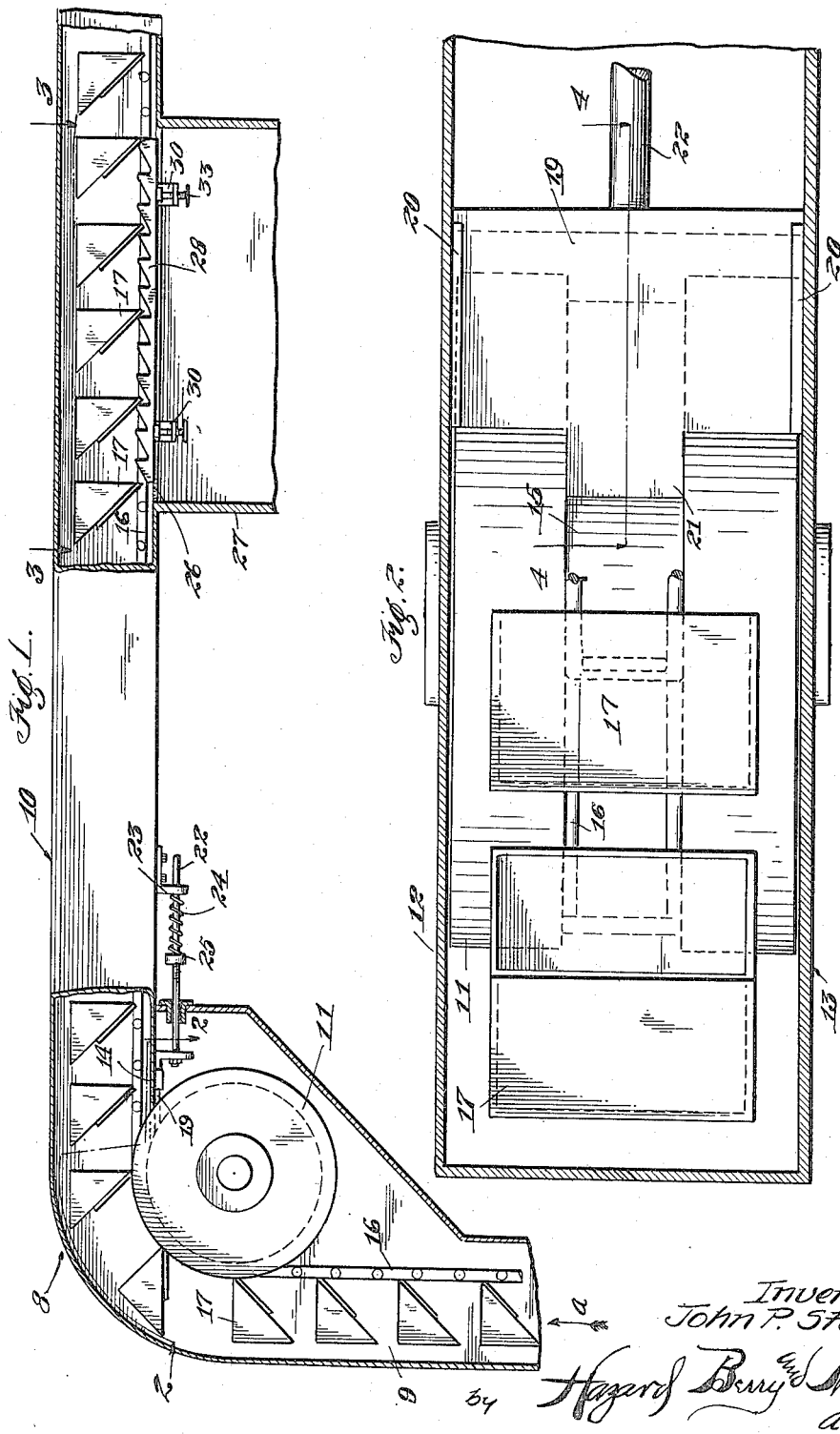

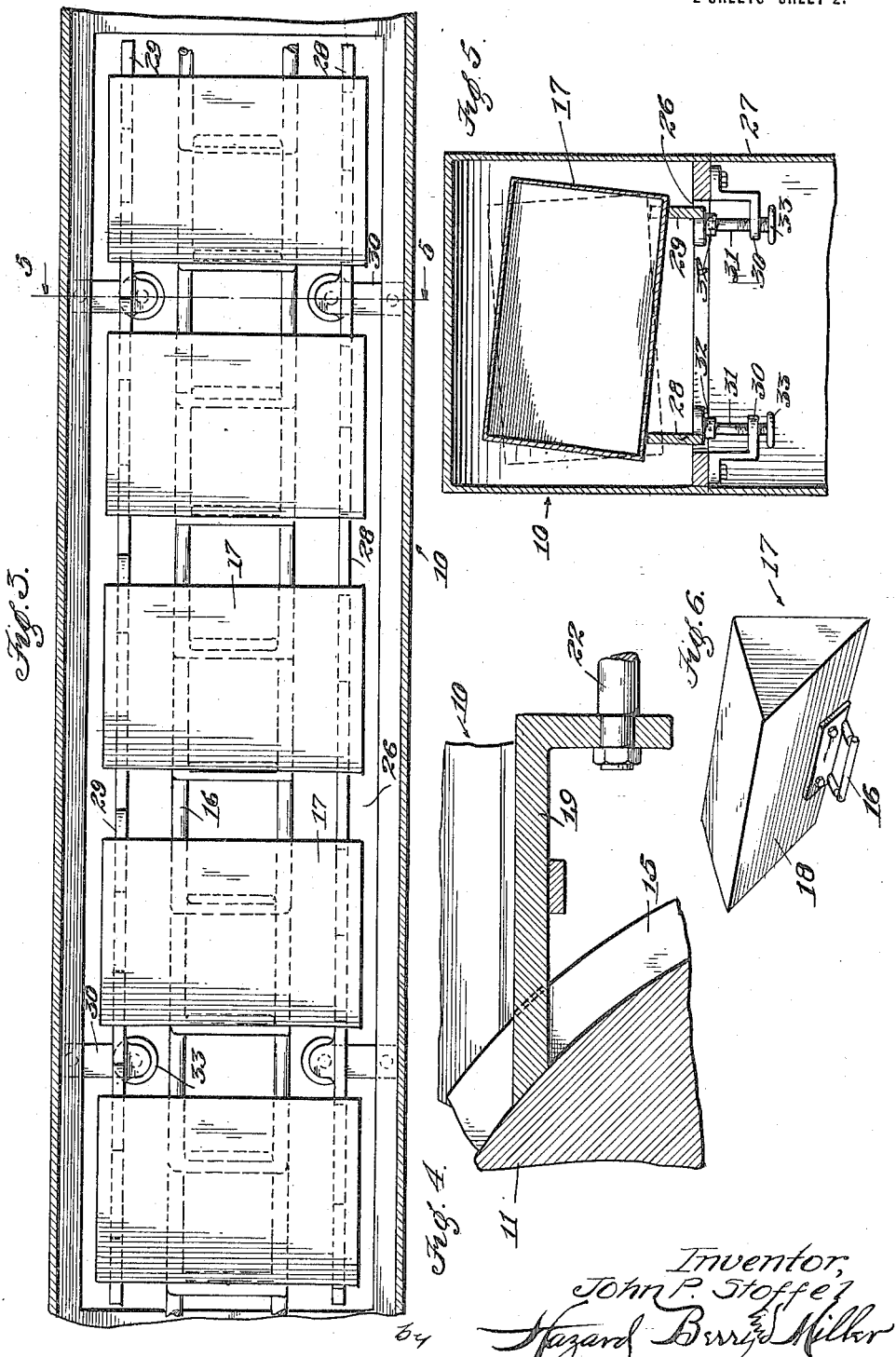

UNITED STATES PATENT OFFICE.

JOHN P. STOFFEL, OF LOS ANGELES, CALIFORNIA.

CONVEYER AND CLEANER.

1,220,703.                    Specification of Letters Patent.      Patented Mar. 27, 1917.

Application filed January 21, 1916. Serial No. 73,329.

*To all whom it may concern:*

Be it known that I, JOHN P. STOFFEL, a citizen of the United States, residing at Los Angeles, in the county of Los Angeles and State of California, have invented new and useful Improvements in Conveyers and Cleaners, of which the following is a specification.

This invention relates to a conveyer for handling granular materials and particularly pertains to a conveyer of the bucket type and to means for cleaning the buckets.

It is the object of this invention to provide a bucket conveyer which is especially adapted for use in flour mills in handling grain, flour or other granular or powdered materials and to provide means for preventing the adherence of the materials to the buckets and to insure the complete discharge of their contents at their point of delivery.

Another object is to provide a bucket conveyer for elevating granular materials from one level to another, in which the conveyer buckets move upwardly, thence passing in a substantial horizontal direction, having means for preventing the backfall of materials at the turning point of the conveyer so as to obviate double lifting of portions of the materials handled by the conveyer.

Another object is to provide a conveyer embodying the above named features, in which the parts are so arranged as to coöperate with each other in maintaining the capacity of the conveyer to a maximum, which is effected by preventing the backfall of materials elevated by the conveyer and insuring their complete discharge from the conveyer so that the buckets will pick up and discharge their full capacity, thus handling the materials but once.

A further object is to provide a construction for carrying out the foregoing objects which is simple, compact and economical and which is equipped with adjustments whereby the parts may be set up to compensate for wear.

Other objects will appear hereinafter.

The invention is illustrated in the accompanying drawings in which:

Figure 1 is a view in vertical section and elevation of the upper portion of the conveyer, showing the means for preventing backfall of the materials and the means for vibrating or shaking the conveyer buckets.

Fig. 2 is an enlarged detail horizontal section and plan view on the line 2—2 of Fig. 1, showing the slide for preventing backfall of the materials.

Fig. 3 is an enlarged horizontal section and plan view on the line 3—3 of Fig. 1, showing the discharge opening and the vibrators.

Fig. 4 is a detail section and elevation on the line 4—4 of Fig. 2 illustrating the slide and its contact with the conveyer direction roller.

Fig. 5 is a view in section and elevation as seen on the line 5—5 of Fig. 3 in the direction indicated by the arrows, showing the adjustable vibrators.

Fig. 6 is a view in perspective of the rear portion of one of the conveyer buckets.

More specifically, 8 indicates the conveyer housing which may be of any suitable construction but is here shown as consisting of a casing of rectangular cross section having an upwardly extending portion 9 connecting at its upper end with a horizontally disposed portion 10. The housing 8 is enlarged at the point of intersection of the portions 9 and 10 thereof to receive an idler pulley wheel 11 which is supported in suitable bearings on the side walls 12 and 13 of the housing. The pulley wheel 11 is of such lateral width that its outer faces will lie close to the inner faces of the walls 12 and 13, as particularly shown in Fig. 2. The bottom wall 14 of the horizontal portion 10 of the housing extends to a point adjacent the outer peripheral edge of the pulley wheel 11 at the upper portion thereof, as shown in Fig. 1. This pulley wheel 11 is formed with a central annular channel 15 on its circumference which is adapted to receive a conveyer chain 16 of any suitable construction. This conveyer chain is of the endless type and passing up through the vertical portion 9 of the housing is carried over the pulley 11 and along the horizontal portion 10 of the housing. The portions of the chain not shown are carried over suitable driving mechanism and through pick-up compartments, as is common in endless chain conveyers.

Mounted on the chain 16 is a series of buckets 17 which are rigidly connected to links of the chain so that the open end of the bucket will normally extend at right angles to the chain. The buckets 17 are preferably of triangular cross section having a sloping bottom wall 18. The formation and the manner of mounting the bucket is illustrated in Fig. 6, Slidably mounted on the under side of the bottom wall 14 adjacent the pulley 11 is a plate 19, the edges of which ride in guide channels 20 on the side walls 12 and 13. The end of the plate 19 adjacent the pulley 11 is shaped to conform to the circumferential face of the pulley having a tongue portion 21 which projects into the annular channel 15 in slidable contact with the bottom and side walls of the latter. The edge of the plate 19 also contacts the outer peripheral edge of the pulley on each side of the channel 15. The edge of the plate is beveled on its under side so as to conform to the curvature of the pulley and form a close slidable joint when the plate is in contact with the latter.

Means are provided for normally maintaining the plate in slidable engagement with the pulley so as to prevent the backfall of materials discharged from the buckets 17 into the vertical portion 9 of the housing when the buckets are tilted to the discharging position in passing over the pulley 11. This means is here shown as consisting of a slidable rod 22, one end of which is connected to the plate 19. The rod 22 is carried by a bracket 23 depending from the bottom wall 14, and extends through the inner wall of the enlarged portion of the housing into the interior of the latter.

As a means for maintaining the slide plate 19 in its foremost position, a spring 24 is wound on the rod 22 and bears between the bracket 23 and a collar 25 on the rod. The collar 25 is threaded on the rod so that it may be turned to adjust the tension of the spring 24. This spring exerts a forward longitudinal pressure on the rod 22 and holds the forward edge of the plate 19 in close contact with the pulley wheel 11.

The bottom wall 14 is formed with a discharge opening 26 leading to a down chute 27. This opening is substantially the width of the horizontal portion of the housing.

Means are provided for vibrating the buckets as they pass over this discharge opening. This means is particularly shown in Figs. 3 and 5 and consists of a pair of parallel bars 28 and 29 which are formed with serrated upper edges and are positioned so that the buckets, when being advanced by the chain 16, are caused to engage and ride over the serrations or teeth on the bars 28 and 29.

The bars 28 and 29 are preferably so arranged in relation to each other that the depression between the teeth on one bar is opposite the apex of the tooth on the other bar. By this arrangement the buckets are caused to cant from one side to another in passing along the serrated bars as illustrated in Fig. 5. It is desirable that the bars 28 and 29 be adjustable so as to vary their level and the consequent action on the conveyer buckets. For this purpose, hangers 30 are mounted adjacent each end of the bars in which vertically extending threaded stems 31 are mounted. The upper ends of the stems 31 are secured to the bars 28 and 29 by pivot joints 32 and the lower ends of the stems are fitted with hand-wheels 33 by which they may be rotated to advance them longitudinally in their brackets 30 to raise and lower the bars 28 and 29.

In the operation of the invention, the conveyer chain 16 is caused to travel in the direction indicated by the arrow $a$ in Fig. 1; the buckets 17 picking up a load of granular materials at the lower end of the upwardly moving vertical section of the chain as is common in conveyer and elevator operations. The buckets 17 in passing over the pulley 11, are tilted so as to discharge the major portion of the contents of the buckets upon the slide plate 19 and the bottom wall 14. The buckets, in advancing, carry the major of the portions that accumulate in the horizontal portion 10 of the housing and discharge them through the opening 26. The conveyer buckets, in passing over the serrated bars 28 and 29, are vibrated and at the same time rocked laterally so as to jar loose such of the granular materials as may cling thereto. The opening 26 and the bars 28 and 29 are of such length that the buckets will be comparatively clean and their contents thoroughly discharged by the time they pass from above the discharge opening.

By the foregoing construction and arrangement of parts, the conveyer buckets will carry their maximum capacity of materials on each operation and will handle the materials but once, so as to be high in efficiency.

What I claim is:

1. In a conveyer, a plurality of flexibly connected buckets, a pair of serrated members arranged to engage and jar the buckets on advance movement of the latter, said serrated members arranged with the serrations on one member staggered in relation to the serrations on the other member.

2. In a conveyer, the combination with a chain and a series of buckets thereon, of a pair of serrated bars arranged to engage and jar the buckets on forward movement of the chain, the serrations of one of said members being disposed in staggered relation to the serrations on the other member, and means for adjusting said members in relation to each other and to the buckets.

3. In a conveyer, a chain, a plurality of buckets thereon, a housing inclosing said chain and buckets having a substantially horizontally extending portion formed with a discharge opening over which the chain and buckets pass, and means for jarring the buckets and rocking them transversely as they pass over the discharge opening comprising a pair of serrated bars extending above the discharge opening.

4. In a conveyer, a housing having an upwardly extending portion connecting with a horizontally extending portion, a direction roller at the intersection of the horizontal and vertical portions of said housing, a bucket conveyer in said housing passing upwardly over said roller adapted to discharge into the horizontal portion of the housing, a slidable plate arranged to contact the circumferential edge of the roller to prevent backfall of materials, and yieldable means for maintaining the plate in contact with the roller.

5. In a conveyer, a roller formed with a peripheral channel adapted to receive the chain of the conveyer, a slidable plate formed with a tongue adapted to contact the circumferential face of said roller and having a tongue portion extending into and contacting the walls of the channel, and spring means for maintaining the plate in contact with the roller.

6. In a conveyer, a housing having a vertical and a horizontally extending portion, a peripherally grooved roller at the intersection of the vertical and horizontal portions of the housing having a width substantially that of the inside of the housing, a slidable plate on the under side of the horizontal portion of said housing contacting the roller throughout its width and having a tongue extending into the groove of the roller, and spring means arranged exteriorly of the housing for maintaining the plate in contact with the roller.

In testimony whereof I have signed my name to this specification.

JOHN P. STOFFEL.

Copies of this patent may be obtained for five cents each, by addressing the "Commissioner of Patents, Washington, D. C."